(12) United States Patent
Chass

(10) Patent No.: US 6,504,271 B2
(45) Date of Patent: Jan. 7, 2003

(54) FERROFLUIDIC, ELECTROMAGNETIC POWER GENERATOR

(76) Inventor: Jacob Chass, 70-25 Yellostone Blvd. Apt. 24D, Forest Hills, NY (US) 11375

( * ) Notice: Subject to any disclaimer, the term of this patent is extended or adjusted under 35 U.S.C. 154(b) by 111 days.

(21) Appl. No.: 09/798,066

(22) Filed: Mar. 5, 2001

(65) Prior Publication Data

US 2002/0153781 A1 Oct. 24, 2002

(51) Int. Cl.[7] .................................................. G01P 15/11
(52) U.S. Cl. ......................................... 310/11; 73/154.09
(58) Field of Search .......................... 310/11; 73/514.08; 33/377

(56) References Cited

U.S. PATENT DOCUMENTS

| | | | | |
|---|---|---|---|---|
| 3,516,294 A | * | 6/1970 | Schmieder | 73/514.08 |
| 3,839,904 A | * | 10/1974 | Stripling et al. | 33/366.15 |
| 4,023,278 A | * | 5/1977 | Hoyt | 33/377 |
| 4,064,409 A | * | 12/1977 | Redman | 165/104.14 |
| 4,220,907 A | * | 9/1980 | Pappas et al. | 310/15 |
| 5,632,093 A | * | 5/1997 | Elias | 33/366.25 |
| 5,908,987 A | * | 6/1999 | Raj | 73/514.08 |

FOREIGN PATENT DOCUMENTS

| | | | | | |
|---|---|---|---|---|---|
| JP | 02138875 A | * | 5/1990 | | G01P/15/11 |
| JP | 03072267 A | * | 3/1991 | | G01P/15/11 |

* cited by examiner

Primary Examiner—Nestor Ramirez
Assistant Examiner—Heba Yousri M. Elkassabgi

(57) ABSTRACT

A ferrofluidic electromagnetic power generator installed within a rotating object, such as the interior of a vehicular tire generates electric current in an electrical coil wound about an elongated, hermetically sealed housing made of non-magnetic material, partially filled with magnetized ferrofluid. A permanent magnet and two magnetic pole pieces enclosing the housing and the coil in conjunction with the ferrofluid form a magnetic circuit. Rotation and horizontal velocity of the tire will propel the magnetized ferrofluid within the sealed housing causing induction in the electrical coil.

14 Claims, 6 Drawing Sheets

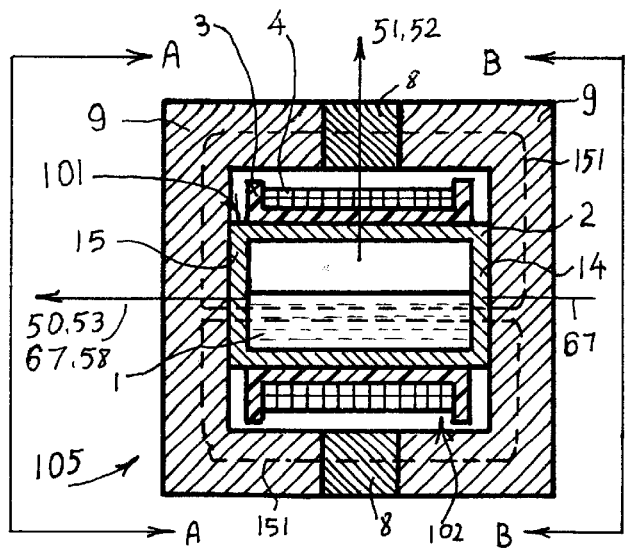

FERROFLUIDIC, ELECTROMAGNETIC POWER GENERATOR

CROSS REFERENCES

United States Patents
U.S. Pat. No. 3,839,904 October 1974 Stripling et al.
U.S. Pat. No. 4,064,409 December 1977 Redman
U.S. Pat. No. 4,220,907 September 1980 Pappas et al.
U.S. Pat. No. 5,632,093 May 1997 Elias
U.S. Pat. No. 5,908,987 June 1999 Raj; Kuldip

BACKGROUND OF THE INVENTION

The present invention relates to an electromagnetic power generator and in particular to an electrical power generator intended for installation within a vehicular tire. Such electrical power generator can supply electrical power to energize a pressure sensor and a high frequency radio transmitter for monitoring tire air-pressure while traveling. Incorrect low tire pressure may cause, while traveling, tire rupture and an accident. Such system is described in U.S. Pat. No. 4,220,907, electromagnetic power generator, by Dennis G. Pappas et al. A change in the mechanical form of a vehicular tire, while traveling, is utilized for opening and closing a magnetic circuit thus generating electrical power. Another system for generating electrical power utilizing ferrofluid is described in U.S. Pat. No. 4,064,409, by Charles M. Redman. Thermal energy is converted into electrical power using flow of magnetized ferrofluid through a coil. An additional system utilizing ferrofluid and a permanent magnet is described in U.S. Pat. No. 5,632,093 by Sharon A. Elias, where mechanical vibrations are converted into an electrical voltage.

SUMMARY OF THE INVENTION

The ferrofluidic, electromagnetic power generators constructed in accordance with the principles of the present invention consists of: a sealed, elongated housing made of non-magnetic material partially filled with ferrofluid; an electrical coil wound of insulated, electrically conductive wire disposed about a portion of said housing; a permanent magnet and two magnetic frames. The permanent magnet, the magnetic frames and the magnetized ferrofluid form a magnetic circuit encompassed by said coil. Said electromagnetic power generator may be firmly attached to the outer steel rim of a vehicular tire. Rotation and horizontal velocity of said tire will cause propulsion of the magnetized ferrofluid within the sealed housing and therefore, induction in the electrical coil. In view of the above it is the principal object of the present invention to provide an electromagnetic power generator to power a pressure sensor and radio transmitter for the purpose of monitoring air pressure within the tire while the vehicle is in motion.

A further object is to provide such a device which may be small in size reliable, with no movable solid mechanical components.

A still further object is to provide such a device, which is simple in design and easy to manufacture.

The above objects and advantages are attained with the present invention by providing two embodiments of a ferrofluidic, electromagnetic power generator.

BRIEF DESCRIPTION OF THE DRAWINGS

FIG. 9 is a schematic diagram, side view section of a design variation of the first embodiment of the invention.

FIG. 10 is a front view along line A—A and line B—B of FIG. 9 in the direction of the arrows.

FIG. 11 illustrates side view of the permanent magnet, axially polarized, shown in FIG. 9.

FIG. 12 illustrates front and back view of the permanent magnet shown in FIG. 9.

FIG. 13 is a schematic diagram, side view section of the second embodiment of the invention.

FIG. 14 illustrates front view along the line D—D of FIG. 13 in the direction of the arrows, showing housing, magnetic frame and circular opening in magnetic frame. Said frame is of magnetic material.

Also shown are vector diagrams of velocity vectors due to vehicle horizontal velocity.

DETAILED DESCRIPTION OF THE DRAWINGS

Figure 1:
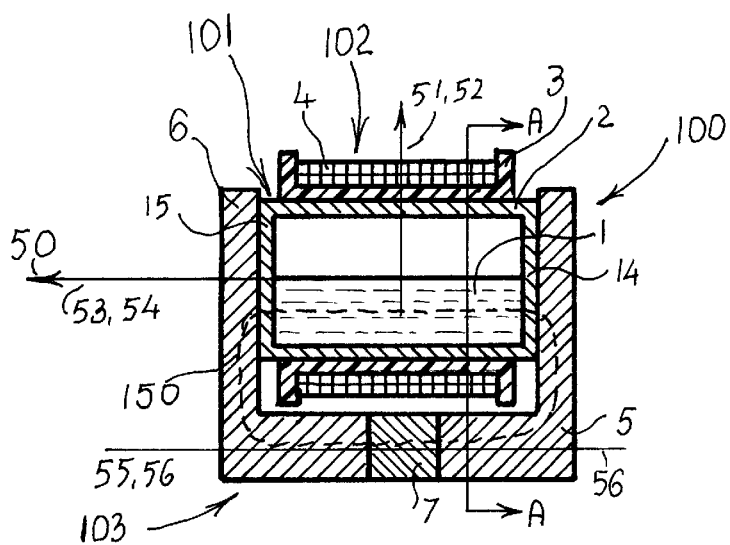
FIG. 1 is a schematic diagram, side view section, of the first embodiment of the invention.
Figure 2:
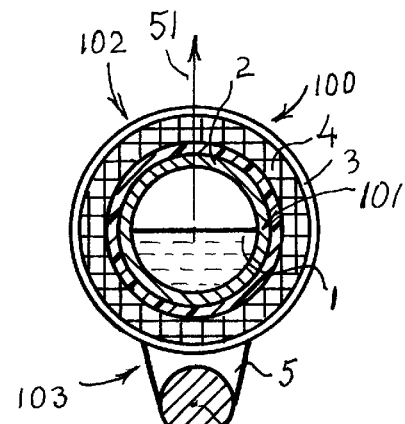
FIG. 2 is a front view section, along the line A—A of FIG. 1 in the direction of the arrows.
Figure 4:
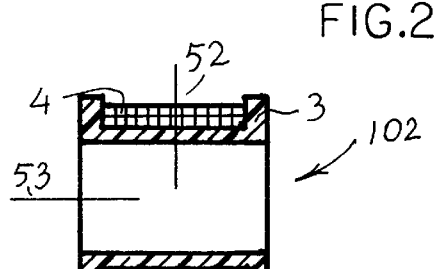
FIG. 4 is a schematic diagram, side view section, of the bobbin-coil assembly.
Figure 5:
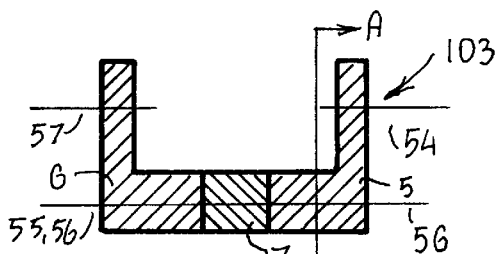
FIG. 5 is a schematic diagram, side view section, of the permanent magnet and magnetic elongated frames assembly. Said magnetic frames are of magnetic material.
Figure 6:
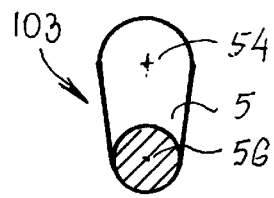
FIG. 6 is a front view section along line A—A of FIG. 5 in the direction of the arrows.
Figure 7:
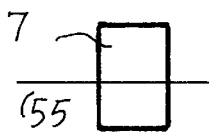
FIG. 7 illustrates side view of the permanent magnet axially polarized.
Figure 8:
FIG. 8 illustrates front and back view of the permanent magnet.

Reference is now made to the drawings and to FIG. 1 in particular wherein a first embodiment of ferrofluidic, electromagnetic power generator in accordance with the present invention is depicted. The power generator 100 comprises a housing assembly 101, a bobbin-coil assembly 102 and magnetic assembly 103. Housing assembly 101 (FIG. 3) comprises a closed housing 2, made of non-magnetic material, said housing having two closed ends 14 and 15, axis and axial direction 50, radial line of lateral symmetry and direction, 51. Housing 2 is partially filled with ferrofluid 1. Bobbin-coil assembly 102(FIG. 4) comprising bobbin 3 and coil 4. Said bobbin has a hollow center core which extends its entire length and is made of a non-magnetic, non-conductive material. A coil 4 is wound about said bobbin. Coil 4 is wound of insulated, electrically conducting wire. Line 53 is the axis of assembly 102 and line 52 is its radial line of lateral symmetry. Housing assembly 101 is firmly attached within said hollow center core of bobbin 3. Axes 50 and 53 coincide. Lines 51 and 52 coincide. Magnetic assembly 103 (FIG. 5) comprises a permanent magnet 7 (FIG. 7, FIG. 8) axially polarized along axis 55, and two elongated frames, 5 and 6. Said frames are made of magnetic material and include axes 54, 56 and 57 (FIG. 5, FIG. 6). Permanent magnet 7 and elongated frames 5,6 are firmly attached, axes 54, 57 coincide, axes 55, 56 coincide (FIG. 5, FIG. 6). Housing-bobbin-coils assembly is firmly attached within magnetic assembly 103 (FIG. 1), axes 50, 53, 54 and 57 coincide, forming ferrofluidic, electromagnetic power generator 100 (FIG. 1 FIG. 2). Magnetic circuit 150 (FIG. 1) extends from permanent magnet 7 to elongated frame 5 to closed end 14 to ferrofluid 1 to closed end 15 to elongated frame 6 and back to permanent magnet 7.

A change in the velocity of assembly 100 (FIG. 1) in direction 50, due to horizontal velocity V and tire rotation, will cause the magnetized ferrofluid 1 to be propelled toward closed end of housing 2 causing induction in coil 4, and generating electromotive force.

Referring to FIG. 9, assembly 104. It is a variation of assembly 100, FIG. 1, comprising assembly 101 (FIG. 3), assembly 102 (FIG. 4) and magnetic assembly 105. Said magnetic assembly comprises permanent magnet 8 (FIG. 11, FIG. 12) axially polarized along axis 58, and two magnetic cups 9 (FIG. 9) said magnetic cups are made of magnetic material, equal to each other and having axes 67 (FIG. 9). Assembly procedure of assembly 104 is similar to the assembly procedure of assembly 100. Axes 50, 53, 67 and 58 coincide. Magnetic circuit 151 (FIG. 9) extends from permanent magnet 8 to magnetic cup 9 to closed end 14 of housing 2 to ferrofluid 1 to closed end 15 of housing 2 to second magnetic cup 9 and back to permanent magnet 8. The operation of ferrofluidic, electromagnetic power generator 104 is very similar to the operation of ferrofluidic, electromagnetic power generator 100.

Figure 3:
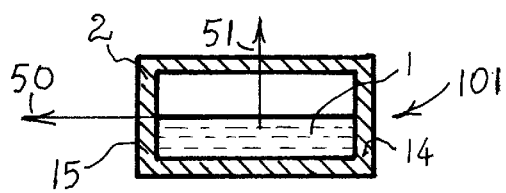
FIG. 3 is a schematic diagram, side view section, of the housing assembly.
Figure 13A:
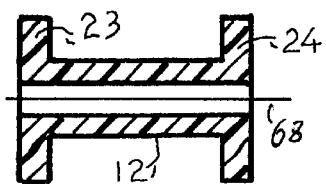
FIG. 13A illustrates side view in section the bobbin utilized in the second embodiment of the invention, showing radial flanges.
Figure 13B:
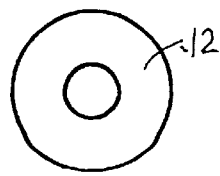
FIG. 13B illustrates front and back view of the bobbin utilized in the second embodiment of the invention.

Reference is now made to FIG. 13 wherein a ferrofluidic, electromagnetic power generator in accordance with the second embodiment of the present invention is depicted. The generator 106 (FIG. 13) comprises housing assembly 101 (FIG. 3), bobbin-coil assembly 107, and magnetic assembly 108. Bobbin-coil assembly 107 is similar to bobbin-coil assembly 102 in all details except bobbin length. Bobbin 12 (FIG. 13A) is shorter than bobbin 3 (FIG. 4). The axial length of bobbin 12 is about ⅓ of the axial length of housing 2 (FIG. 3). Housing assembly 101 is firmly attached within hollow center core of bobbin 12. Edge of closed end 15 of housing 2 and edge of flange 23 of bobbin 12 coincide (FIG. 13A, FIG. 13). Axis 68 (FIG. 13A) and axis 50 (FIG. 2) coincide. Magnetic assembly 108 comprises: magnetic frame 10 comprising a radial section of hollow cylinder, one end blocked, blocked end having an opening 22 (FIG. 14); magnetic cover 11 and permanent magnet 7. Magnetic frame 10 is displaced in direction 50 over housing assembly 2 (FIG. 3) through a circular opening 22 (FIG. 14) to a stop provided by flange 24 of bobbin 12. Axes 61,62 of magnetic frame 10 and axis 50 coincide. Magnetic frame 10 is firmly attached to bobbin 12 and housing 2 (FIG. 13). Permanent magnet 7 is firmly attached to the closed end 15 of housing 2. Axis 55 of permanent magnet 7 and axis 50 of housing 2 coincide. Magnetic cover 11 is firmly attached to permanent magnet 7 and to the inner diametrical surface of magnetic frame 10 (FIG. 13). Magnetic circuit 152 extends from permanent magnet 7 to closed end 15 to ferrofluid 1 to opening 22 to magnetic frame 10 to magnetic cover 11 and back to permanent magnet 7. The operation of ferrofluidic, electromagnetic power generator 106 is very similar to the operation of ferrofluidic, electromagnetic power generator 100.

Figure 15:
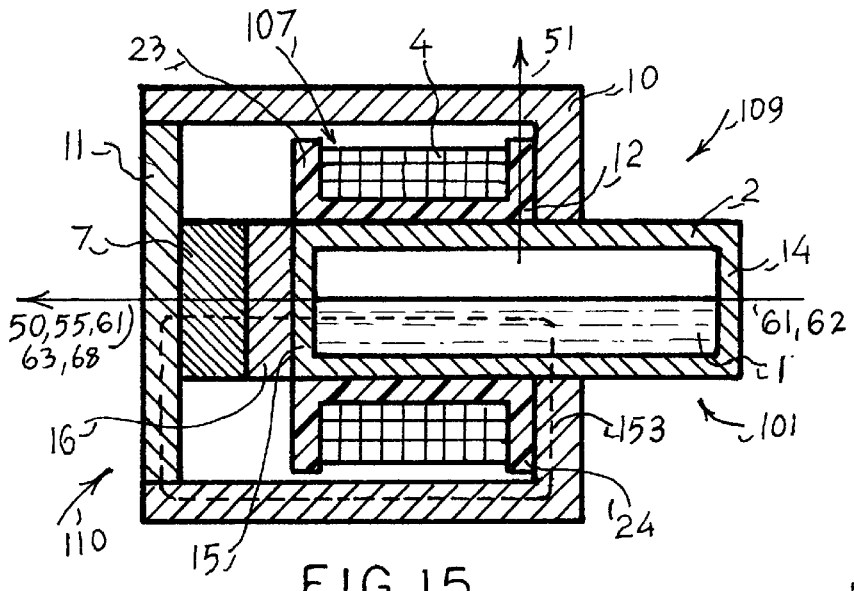
FIG. 15 is a schematic diagram, side view section of a design variation of FIG. 13.
Figure 16:
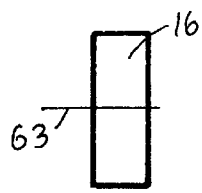
FIG. 16 illustrates side view of the magnetic pole-piece.
Figure 17:
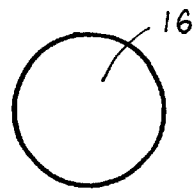
FIG. 17 illustrates front and back view of the pole-piece, a radial section of a solid cylinder of magnetic material.

Reference is now made to ferrofluidic, electromagnetic power generator 109 (FIG. 15). It is a variation of assembly 106. Pole-piece 16 (FIG. 16, FIG. 17) is firmly attached to permanent magnet 7 and to closed end 15 of housing 2. Axis 63 (FIG. 16), axis 50 of housing 2 (FIG. 3) and axis 55 of permanent magnet 7 (FIG. 7) coincide. Pole-piece 16 was installed between permanent magnet 7 and housing 2 in order to reduce sedimentation of ferrofluid particles close to the permanent magnet surface. Magnetic circuit 153 of magnetic assembly 110 extends from permanent magnet 7 to pole-piece 16 to closed end 15 of housing 2 to ferrofluid 1 to frame 10 and back to permanent magnet 7.

Figure 13C:
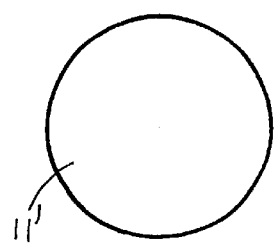
FIG. 13C illustrates front and back view of magnetic cover; said cover is of magnetic material.
Figure 18:
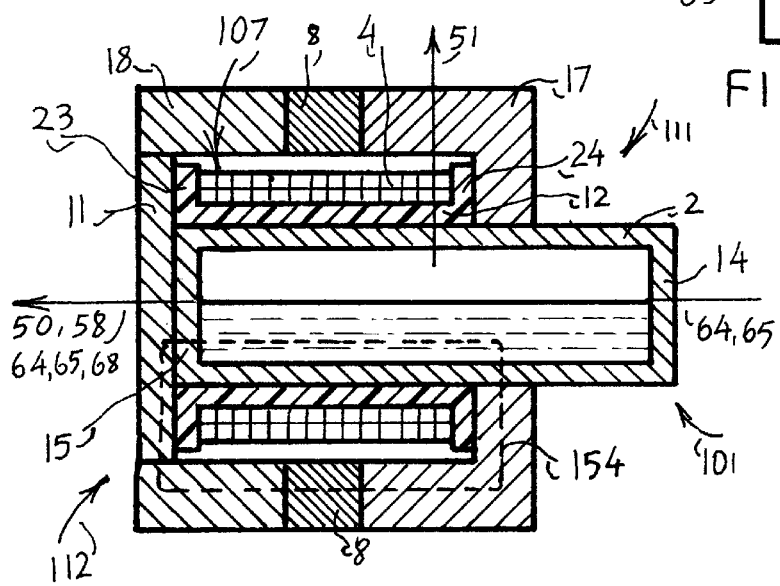
FIG. 18 is a schematic diagram, side view section of a design variation of the second embodiment of the invention.

Reference is now made to ferrofluidic, electromagnetic power generator 111 (FIG. 18). It is a variation of the second embodiment of the invention. Assembly 111 comprises: housing assembly 101; bobbin-coil assembly 107 and magnetic assembly 112. The variation is the replacement of magnetic assembly 110 (FIG. 15) by magnetic assembly 112 (FIG. 18). Magnetic assembly 112 comprises: magnetic short frame 17; permanent magnet 8 (FIG. 11); magnetic cylinder 18 and magnetic cover 11 (FIG. 13C). Assembly procedure of generator 111 is similar to assembly procedure of generator 109 (FIG. 15). Short frame 17 (FIG. 18) is displaced in the direction 50 over housing assembly 2 through circular opening 22 (FIG. 14) to a stop provided by flange 24 of bobbin 12. Axis 64 of short frame 17 and axis 50 of housing assembly 2 coincide. Short frame 17 is firmly attached to bobbin 12 and to housing 2. Permanent magnet 8 is firmly attached to short frame 17. Axis 64 of short frame 17 and axis 58 of permanent magnet 8 coincide. Magnetic cylinder 18 (FIG. 18) is firmly attached to permanent magnet 8. Axis 65 of magnetic cylinder 18 and axis 58 of permanent magnet 8 coincide. Magnetic cover 11 is firmly attached to closed end 15 of housing 2, and to the inner surface of magnetic cylinder 18, forming magnetic circuit 154 (FIG. 18). Magnetic circuit 154 extends from permanent magnet 8 to magnetic short frame 17 to ferrofluid 1 to closed end 15 to magnetic cover 11 to magnetic cylinder 18 and back to permanent magnet 8.

Figure 19:
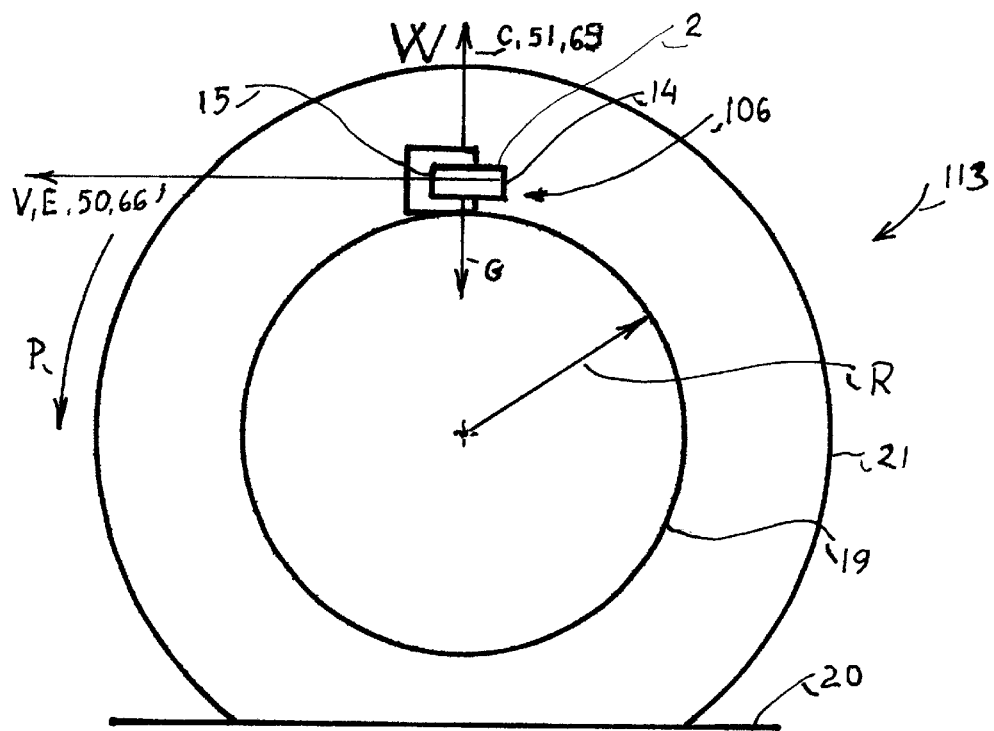
FIG. 19 is a schematic diagram, side view of the second embodiment of the invention firmly attached to the steel rim of a vehicular tire, in its angular position W.

Reference is now made to assembly 113, FIG. 19 wherein ferrofluidic, electromagnetic generator 106 (FIG. 13) firmly attached to the steel rim 19 of a tire is depicted. At position W, radial line 51 of assembly 106 and radial line 69 of steel rim 19 coincide. Axial direction 50 of housing 2 is parallel to plain 20 and coincides with vehicular travel direction 66. Shown are vehicle velocity V, gravity G, tire rate of rotation P, steel rim radius R and centrifugal force C. Velocity V and travel direction 66 coincide. Direction of velocity V and axial direction 50 of housing 2 coincide. Angular orientation of radial line 51 and radial direction 51 of assembly 106

(FIG. 13) are shown in FIG. 19, 20, 21 and 22, where angle φ is 90 degrees of arc.

FIG. 19. Position W: radial line 51 is perpendicular to plane 20. Radial direction 51 pointing away from plane 20.

Figure 20:
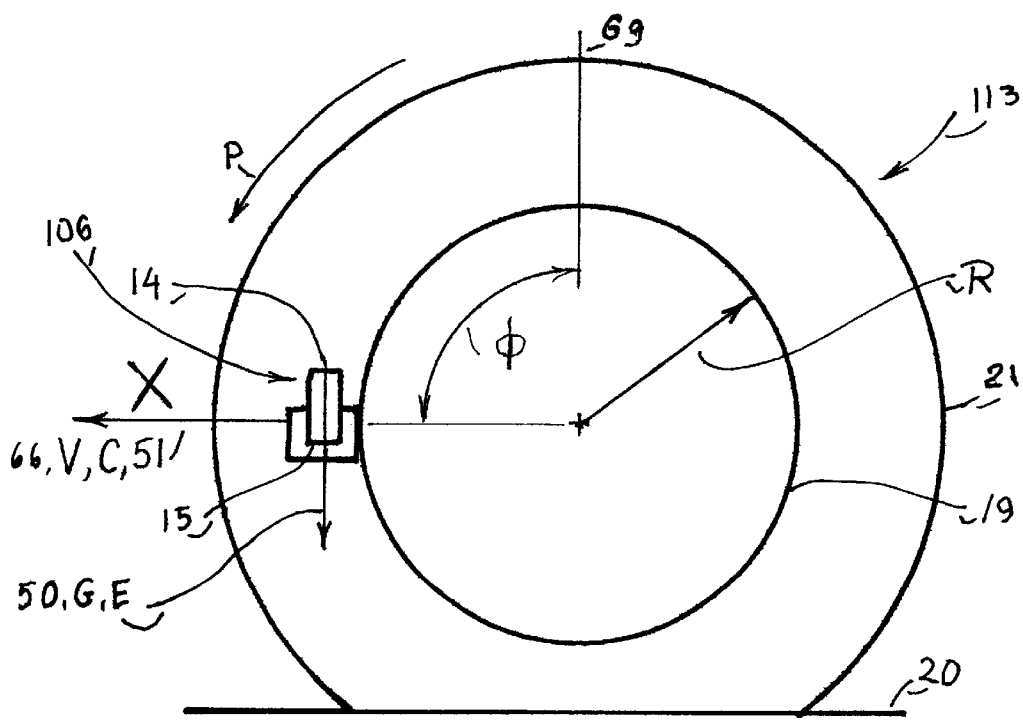
FIG. 20 is a schematic diagram, side view, of the second embodiment of the invention firmly attached to the steel rim of a vehicular tire, in its angular position X.

FIG. 20. Position X: radial line 51 is parallel to plane 20. Radial direction 51 coincides with direction 66 of velocity V.

Figure 21:
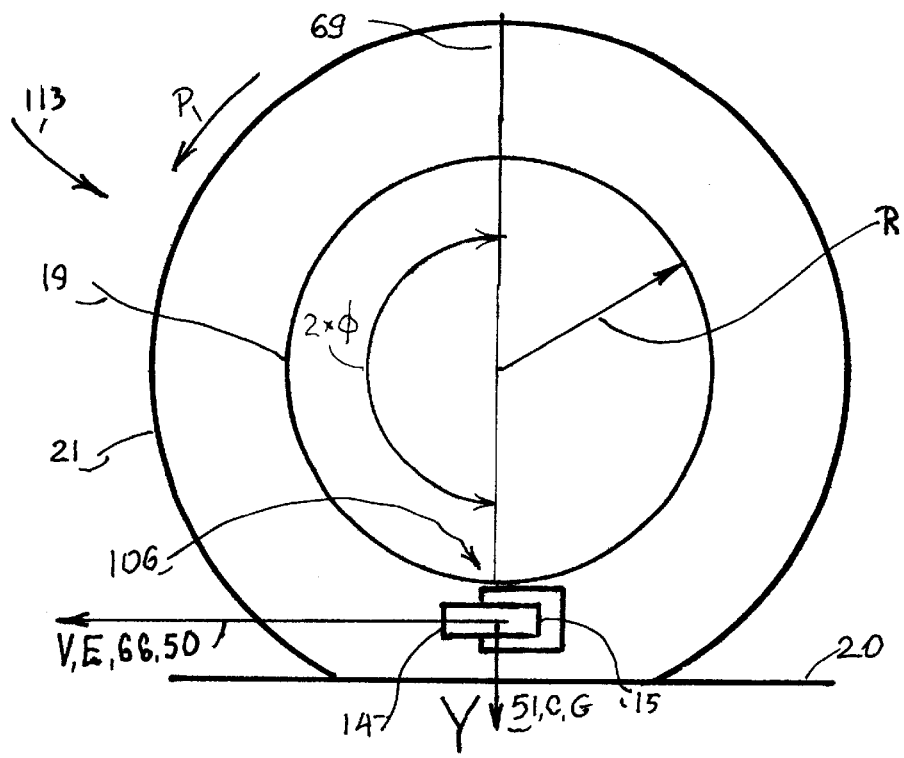
FIG. 21 is a schematic diagram, side view, of the second embodiment of the invention firmly attached to the steel rim of a vehicular tire, in its angular position Y.

FIG. 21. Position Y: radial line 51 is perpendicular to plane 20. Radial direction 51 pointing into Plane 20.

Figure 22:
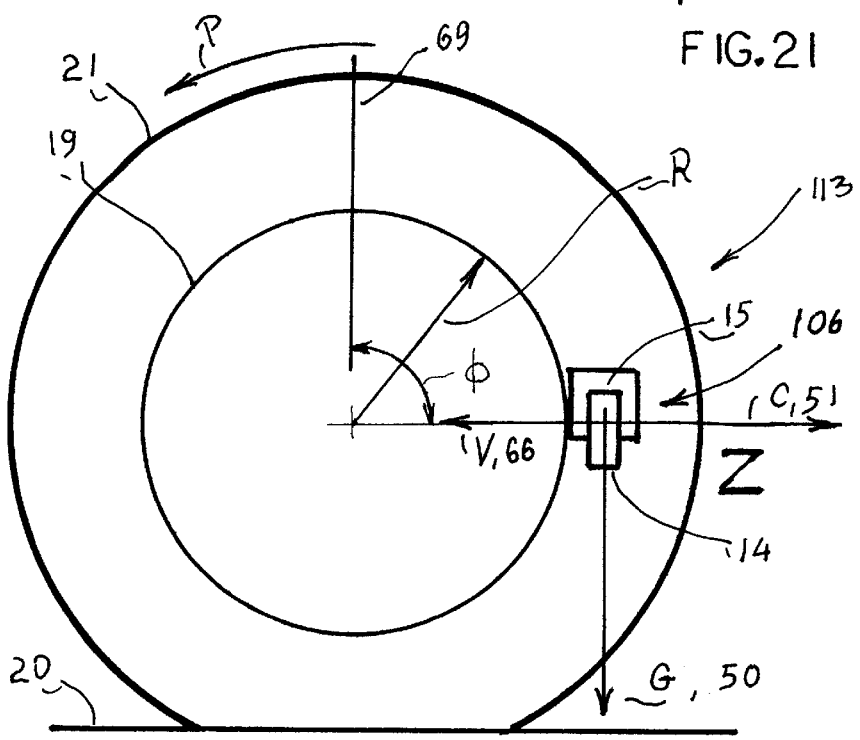
FIG. 22 is a schematic diagram, side view, of the second embodiment of the invention firmly attached to the steel rim of a vehicular tire, in its angular position Z.

FIG. 22. Position Z: radial line 51 is parallel to plane 20. Radial direction 51 is reversed to direction 66 of velocity V.

Ferrofluid 1 within housing 2 is subjected, while traveling in direction 66, at velocity V to the following forces:

1. Force of gravity G.
2. Centrifugal force C.
3. Force I, due to the mass of ferrofluid 1 and variation of velocity V in direction 50.
4. Axial force due to the permanent magnet 1. Force of gravity G. Direction of G is perpendicular to plain 20 and therefore ferrofluid 1 within housing 2 will be propelled by G toward plain 20 in a direction perpendicular to plain 20.

2. Centrifugal force C. Direction of C and direction 51 coincide. Magnitude of C is a function of radius R, rotation rate P and the mass of ferrofluid 1. Rotation P will cause ferrofluid 1 to be propelled in direction 51.

3. Force I equals to the multiplication of mass of ferrofluid 1 and acceleration of assembly 106 in direction 50, due to velocity V.

4. Axial force tends to maintain continuous magnetic circuit.

Figure 23:
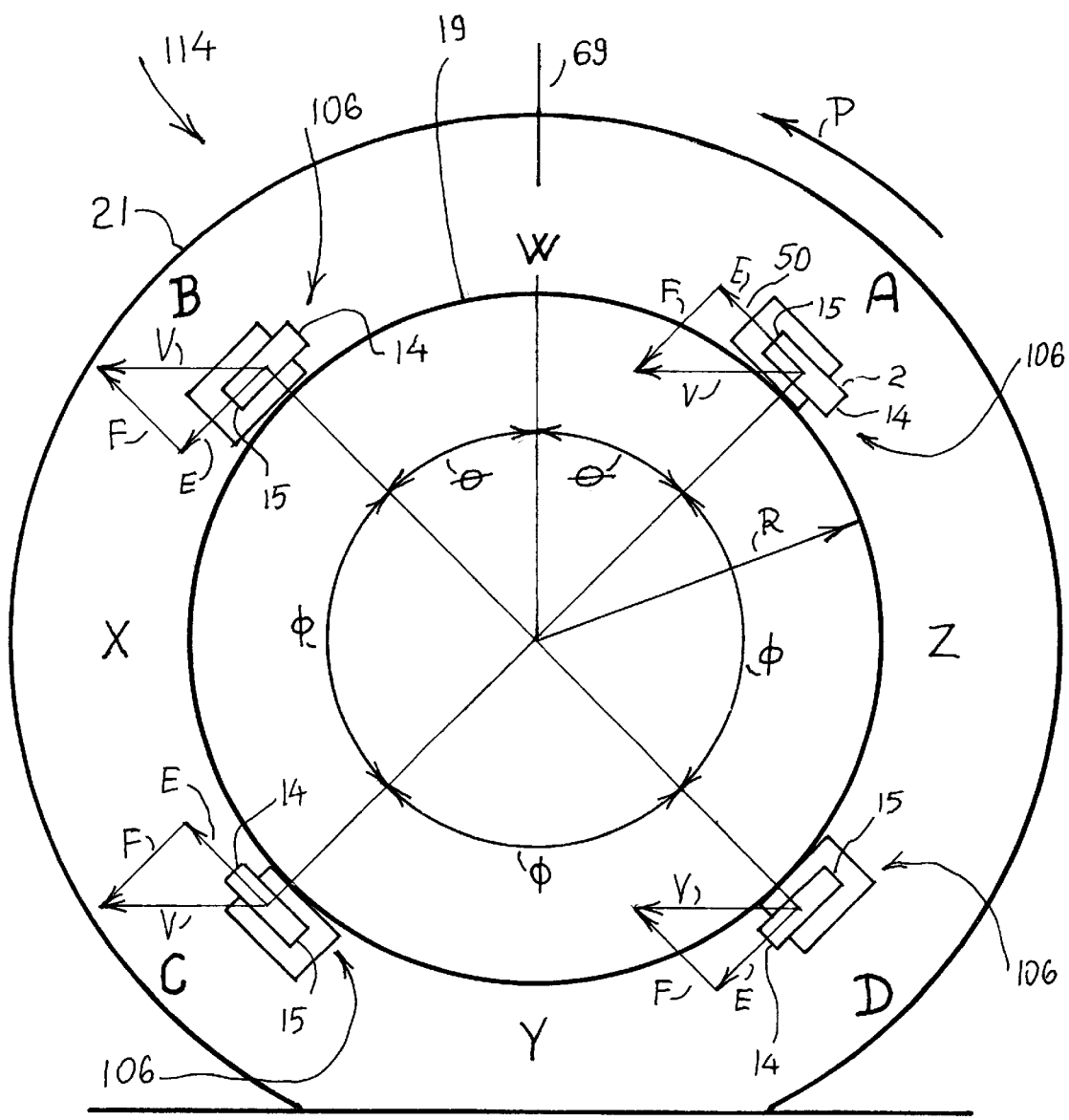
FIG. 23 is a schematic diagram of assembly 106, attached to steel rim 19, in four angular positions.

Reference is now made to FIG. 23 wherein assembly 106 attached to rim 19 is depicted. Assembly 114 displays assembly 106 in four positions: A, B, C and D. Shown in position A vectors of velocity V, velocity E and velocity F. Velocity E and axial direction 50 coincide. Velocity V is the vector sum of E and F. At position Z, FIG. 22, E=0 and F=V; at position W, FIG. 19 F=0 and E=V. Variations of E position W is zero, since its magnitude is at a maximum. The variations of E near position Z are very low since magnitude of E is very low and E is zero at position Z. Therefore, variation in magnitude of E will reach a maximum at position A (FIG. 23) located between Z and W (FIG. 22, FIG. 19). Velocity change is acceleration and acceleration multiplied by mass equals force. Ferrofluid 1 will be propelled, due to the inertia of its mass, toward closed end 14 of housing 2. At position W (FIG. 19), acceleration in direction 50 is zero and therefore ferrofluid 1 will be propelled in direction 51 due to force C. At position B (FIG. 23) ferrofluid 1 will be propelled toward closed end 14, due to a maximum change of E. At position X (FIG. 20) E is zero, changing direction; acceleration in direction 50 is very low and therefore ferrofluid 1 will be propelled in direction 51 due to force C. At position C (FIG. 23) ferrofluid 1 will be propelled toward closed end 15 due to a maximum change of E. At position Y (FIG. 21) acceleration in direction 50 is zero because E=V and E is at a maximum magnitude. Therefore, ferrofluid 1 will be propelled in direction 51 due to force C. At position D ( FIG. 23) ferrofluid 1 will be propelled toward closed end 15 due to a maximum change of E. At positions A and B (FIG. 23) ferrofluid 1 will be separated from closed end 15 and therefore magnetic circuit 152 (FIG. 13) will be interrupted, causing an abrupt change in the magnitude of said magnetic flux flow and causing an induction in coil 4 (FIG. 13), generating electromotive force. At positions C and D magnetic circuit 152 (FIG. 13) will be intact since ferrofluid 1 will extend from closed end 15 to opening 22 in magnetic frame 10 (FIG. 13, FIG. 14). Angle Θ of position A and B to line 69 is 45 degrees of arc.

Operation of assembly 109 (FIG. 15) and assembly 111 (FIG. 18) are similar to the operation of assembly 106 (FIG. 13).

Referring back to FIG. 23 wherein the second embodiment of the invention is depicted. Replacing assembly 106 by assembly 100 (FIG. 1) it is obvious that magnetic circuit 150 (FIG. 1) will be interrupted at positions A, B, C and D because the change of velocity E will reach a maximum, causing induction in coil 4, generating electromotive force. Referring back to FIG. 19, 20, 21, 22, wherein second embodiment of the invention is depicted. Replacing assembly 106, (FIG. 13) by assembly 100 (FIG. 1) in positions W, X, Y and Z, magnetic circuit 150 (FIG. 1) will be intact due to centrifugal force c and gravity force G. Operation of assembly 104 (FIG. 9) is similar to the operation of assembly 100 (FIG. 1).

Referring back to assembly 101 (FIG. 3): closed end 14 is designated first closed end; closed end 15 is designated second closed end.

Referring back to assembly 103 (FIG. 5): elongated frame 5 is designated first magnetic elongated frame; elongated frame 6 is designated second magnetic elongated frame. Axis 56 of magnetic elongated frames 5 and 6 is designated first axis; axes 54, 57 of magnetic elongated frames 5 and 6 is designated second axis.

Referring back to FIG. 13A: flange 23 of bobbin 12 is designated first flange; flange 24 of bobbin 12 is designated second flange.

Although the inventions have been described with specific reference to two embodiments and modifications thereof, it will be apparent to a knowledgeable person, upon reading this patent, that numerous modifications and alternative materials and arrangements may be devised by those skilled in the art without departing from the spirit and scope of the inventions as defined by the appended claims.

What is claimed is:

1. A ferrofluidic, electromagnetic power generator for inducing electromotive force in an electrical coil comprising:

a closed elongated housing made of non-magnetic material, said housing having two closed ends; said housing partially filled with ferrofluid that has the ability to conduct magnetic flux;

an elongated bobbin made of non-magnetic, non-conductive material, said bobbin having a hollow core center extending its entire length, said housing firmly attached within said hollow core of said bobbin, said bobbin extending at least over portion of housing axial length;

a coil wound of insulated electrically conductive wire disposed about said bobbin; said coil has the ability to produce electrical power upon enclosing a variable magnetic flux flow;

a magnetic assembly comprising: at least one permanent magnet axially polarized; at least two magnetic elongated frames, said magnetic frames are of magnetic material; one end of each of said magnetic elongated frames firmly attached to each closed end of said housing and other end of each magnetic elongated frames firmly attached to each end of said permanent magnet forming a magnetic circuit extending from said permanent magnet to said first magnetic elongated frame to said first closed end of said housing to said magnetized ferrofluid to said second closed end of said housing to said second magnetic elongated frame to said permanent magnet; variation in the distribution of said magnetized ferrofluid within said housing will cause variation in said magnetic circuit causing induction in said coil and producing electrical power; axis of said permanent magnet and first axis of said magnetic elongated frames coincide; axis of said housing and second axis of said magnetic elongated frames coincide, forming a ferrofluidic, electromagnetic power generator.

2. The invention in accordance with claim 1 wherein said permanent magnet is a radial section of a solid cylinder.

3. The invention in accordance with claim 1 wherein said housing is hermetically sealed.

4. The invention in accordance with claim 2 wherein said housing is hermetically sealed.

5. The invention in accordance with claim 2 wherein said housing cross-section is circular.

6. The invention in accordance with claim 3 wherein said housing cross-section is circular.

7. The invention in accordance with claim 1 wherein said magnetic assembly comprising:
   a permanent magnet axially polarized, said permanent magnet is a radial section of a hollow circular cylinder having an inside diameter and an outside diameter;
   two magnetic cups; said magnetic cups are of magnetic material; said magnetic cups are radial sections of a hollow circular cylinder, one end closed; said magnetic cups are radial sections of a hollow circular cylinder, having an inside diameter and an outside diameter;
   said inside diameter of said permanent magnet and inside diameter of said magnetic cups are substantially equal to each other; said outside diameter of said permanent magnet and outside diameter of said magnetic cups are substantially equal to each other;
   said first closed end of said housing is firmly attached, within said magnetic cup, to closed end of said magnetic cup; axis of housing and axis of magnetic cup substantially coincide; said permanent magnet is firmly attached to open end of said magnetic cup; axis of said permanent magnet and axis of said magnetic cup substantially coincide; said second closed end of said housing is firmly attached, within said magnetic cup, to closed end of said magnetic cup and open end of said magnetic cup is firmly attached to permanent magnet; axis of said housing, axis of said permanent magnet and axis of said magnetic cup substantially coincide.

8. The invention in accordance with claim 7 wherein said housing is hermetically sealed.

9. A ferrofluidic, electromagnetic power generator for inducing electromotive force in an electrical coil comprising:
   a closed elongated housing made of non-magnetic material, said housing having two closed ends; said housing partially filled with ferrofluid that has the ability to conduct magnetic flux; said housing cross-section is circular;
   a bobbin-coil assembly;
   a magnetic assembly;
said bobbin-coil assembly comprising: an elongated bobbin made of non-magnetic, non-conductive material, said bobbin having a hollow core center extending its entire length; an electrical coil wound of insulated electrically conductive wire disposed about said bobbin; said coil has the ability to produce electrical power upon enclosing a variable magnetic flux flow; said housing firmly attached within said hollow core of said bobbin, said bobbin extending over portion of housing axial length; edge of said first flange of said bobbin and edge of said second closed end of said housing coincide; said magnetic assembly comprising: a permanent magnet axially polarized, said permanent magnet is a radial section of a circular solid cylinder; a magnetic frame, said magnetic frame is of magnetic material, said magnetic frame comprised of a radial section of a hollow cylinder, one end blocked, blocked end having an opening, said opening is circular in shape, diameter of said circular opening exceeds the diameter of said circular housing; axis of said circular opening and axis of said hollow cylinder coincide; a magnetic cover, said cover is of magnetic material; said housing inserted through open end of said frame into said circular opening, second flange of said bobbin firmly attached to blocked end of said frame; said housing is firmly attached to said circular opening; axes of housing, circular opening and hollow cylinder coincide; said permanent magnet is firmly attached to second closed end of said housing, axis of said permanent magnet and axis of said housing coincide; magnetic cover is deposited within open end of said open cylinder and firmly attached to said permanent magnet and to inner diametrical surface of said hollow cylinder completing a magnetic circuit extending from permanent magnet to second closed end to magnetized ferrofluid to circular opening to hollow cylinder to magnetic cover to permanent magnet; variation in the distribution of said magnetized ferrofluid within said housing will cause variation in said magnetic circuit causing induction in said coil and producing electrical power, thus forming a ferrofluidic, electromagnetic power generator.

10. The invention in accordance with claim 7 wherein said pole-piece is deposited between second closed end of said housing and said permanent magnet; said pole-piece is firmly attached to closed end of said housing and firmly attached to said permanent magnet; axes of housing, pole-piece and permanent magnet substantially coincide; outside diameters of pole-piece, permanent magnet and housing are substantially equal to each other.

11. The invention in accordance within claim 7 wherein said magnetic assembly comprising: a short frame, a permanent magnet, a hollow cylinder and a magnetic cover; short frame and permanent magnet are circular in shape; outside diameter of short frame, outside diameter of permanent magnet and outside diameter of hollow cylinder equal to each other; short frame is of magnetic material; said magnetic short frame comprised of a radial section of a hollow cylinder, one end blocked; blocked end having an opening said opening is circular in shape, diameter of said circular opening exceeds the diameter of said housing; said axis of said circular opening and axis of hollow cylinder coincide; permanent magnet is a radial section of a hollow cylinder; permanent magnet is axially polarized; inside diameter of hollow cylinder, inside diameter of permanent magnet and inside diameter of cylindrical portion of short frame are substantially the same; said housing inserted through open end of said short frame into said circular opening; second flange of said bobbin firmly attached to blocked end of said short frame; said housing is firmly attached to said circular opening; axes of housing, circular opening and hollow cylinder portion of short frame coincide; said permanent magnet is firmly attached to open end of said short frame; axes of permanent magnet and short frame coincide; said hollow cylinder is firmly attached to end of said permanent magnet; axes of hollow cylinder and permanent magnet coincide; magnetic cover is deposited within said hollow cylinder and firmly attached to second end of said housing and firmly attached to the inner diametrical surface of said hollow cylinder completing a magnetic circuit extending from magnetic cover to second closed end of said housing to said ferrofluid to said circular opening to said short frame to said permanent magnet to said hollow cylinder to said magnetic cover forming a ferrofluidic, electromagnetic power generator.

12. The invention in accordance with claim 9 wherein said housing is hermetically sealed.

13. The invention in accordance with claim 10 wherein said housing is hermetically sealed.

14. The invention in accordance with claim 11 wherein said housing is hermetically sealed.

* * * * *